(12) United States Patent  (10) Patent No.: US 7,537,375 B2
Hoff et al.  (45) Date of Patent: May 26, 2009

(54) METHOD AND APPARATUS FOR ADMINISTERING MICRO-INGREDIENT FEED ADDITIVES TO ANIMAL FEED RATIONS

(75) Inventors: Charles H. Hoff, Bellvue, CO (US); Steve R. Freeman, Greeley, CO (US)

(73) Assignee: Lextron, Inc., Greeley, CO (US)

( * ) Notice: Subject to any disclaimer, the term of this patent is extended or adjusted under 35 U.S.C. 154(b) by 330 days.

(21) Appl. No.: 11/676,123

(22) Filed: Feb. 16, 2007

(65) Prior Publication Data

US 2007/0159918 A1 Jul. 12, 2007

Related U.S. Application Data

(62) Division of application No. 10/633,463, filed on Jul. 31, 2003, now Pat. No. 7,325,967.

(51) Int. Cl.
*B01F 15/02* (2006.01)
(52) U.S. Cl. .................... 366/141; 366/163.2
(58) Field of Classification Search .............. 119/51.01; 366/141, 163.1, 163.2, 348, 349; 222/1, 222/77; 177/1; 141/9, 83
See application file for complete search history.

(56) References Cited

U.S. PATENT DOCUMENTS

| | | |
|---|---|---|
| 2,746,728 A | 5/1956 | Pomerleau |
| 3,437,075 A | 4/1969 | Hawes |
| 3,498,311 A | 3/1970 | Hawes |
| 3,670,923 A | 6/1972 | Hawes, Jr. et al. |
| 3,741,440 A | 6/1973 | Sanders, Jr. |
| 3,741,533 A | 6/1973 | Winn, Jr. |
| 3,804,303 A | 4/1974 | Fassauer |
| 3,806,001 A | 4/1974 | Pratt |
| 3,822,056 A | 7/1974 | Hawes, Jr. et al. |
| 3,881,688 A | 5/1975 | Senn |
| 3,981,417 A | 9/1976 | Fassauer |
| 4,086,663 A | 4/1978 | Croft |
| 4,395,131 A | 7/1983 | Barlow |
| 4,430,001 A | 2/1984 | Schurr |
| 4,542,162 A * | 9/1985 | Rutherford et al. ............ 521/79 |
| 4,643,582 A | 2/1987 | Ricciardi |

(Continued)

OTHER PUBLICATIONS

J.S. Melbourne Controls, Pty Ltd, "Melbourne Hydro-Shear Mixer," pp. 1-9, Mar. 2000.

(Continued)

*Primary Examiner*—Tony G Soohoo
(74) *Attorney, Agent, or Firm*—Sheridan Ross P.C.

(57) ABSTRACT

A method and apparatus are provided for administering micro-ingredient feed additives to animal feed rations. The apparatus may be referred to as a system which includes a number of discrete components which cooperate together to ultimately deliver micro-ingredients to a desired location, such as a feed mixer containing a feed ration. Structure is provided for storing, measuring, dispensing, and pneumatically conveying the micro-ingredients. Measuring of the micro-ingredients may be achieved by loss in weight, gain in weight, or volumetric metering methods. Pneumatic transport may be achieved either by a single transport line, or a plurality of transport lines. The system is operated by a control unit which controls components of the system to achieve delivery of specified amounts and types of micro-ingredients to the feed ration.

17 Claims, 5 Drawing Sheets

U.S. PATENT DOCUMENTS

| | | | |
|---|---|---|---|
| 4,733,971 A | 3/1988 | Pratt | |
| 4,801,210 A | 1/1989 | Gian | |
| 4,815,042 A | 3/1989 | Pratt | |
| 4,889,433 A | 12/1989 | Pratt | |
| 4,899,443 A | 2/1990 | Beermann | |
| 4,910,024 A | 3/1990 | Pratt | |
| 5,219,224 A | 6/1993 | Pratt | |
| 5,240,324 A | 8/1993 | Phillips et al. | |
| 5,280,859 A | 1/1994 | Rust et al. | |
| 5,284,388 A | 2/1994 | Volk et al. | |
| 5,303,998 A | 4/1994 | Whitlatch et al. | |
| 5,340,211 A | 8/1994 | Pratt | |
| 5,350,257 A | 9/1994 | Newbolt et al. | |
| RE34,776 E | 11/1994 | Pratt | |
| 5,369,032 A | 11/1994 | Pratt | |
| 5,401,501 A | 3/1995 | Pratt | |
| 5,423,456 A | 6/1995 | Arendonk et al. | |
| 5,487,603 A | 1/1996 | Hoff et al. | |
| 5,634,713 A | 6/1997 | Abe | |
| 5,634,716 A | 6/1997 | Westall et al. | |
| 5,718,507 A | 2/1998 | Gian | |
| 5,853,244 A | 12/1998 | Hoff et al. | |
| 5,899,561 A | 5/1999 | Gian | |
| 6,076,109 A | 6/2000 | Kikinis | |
| 6,203,184 B1 | 3/2001 | O'Callaghan | |
| 6,243,596 B1 | 6/2001 | Kikinis | |
| 6,250,793 B1 | 6/2001 | Gian | |
| 6,329,001 B1 | 12/2001 | Ivey et al. | |
| 6,519,391 B2 | 2/2003 | Kikinis | |
| 6,579,236 B2 | 6/2003 | Pratt | |
| 6,744,946 B2 | 6/2004 | Kikinis | |
| 6,805,075 B2 | 10/2004 | Pratt | |
| 6,901,369 B2 | 5/2005 | Cureton et al. | |
| 6,991,045 B2 | 1/2006 | Vinegar et al. | |
| 7,240,807 B2 * | 7/2007 | Hoff et al. | 222/77 |
| 2002/0066746 A1 * | 6/2002 | Sanders | 222/1 |
| 2005/0024988 A1 | 2/2005 | Hoff et al. | |
| 2005/0263541 A1 * | 12/2005 | Hoff et al. | 222/1 |
| 2007/0145068 A1 * | 6/2007 | Hoff et al. | 222/1 |
| 2008/0283551 A1 * | 11/2008 | Hoff et al. | 222/1 |

OTHER PUBLICATIONS

Motionless Mixer—A series (Inline) product information sheet, Komax Systems, Inc., date unknown.

Solt, "Designing a pressure conveying system fed by a venturi," pp. 17-12, Powder and Bulk Engineering, Jul. 2001.

The Ejector Venturi Scrubber product information sheet, available at http://www.s-k.com/content/products/scrub_sys/c_scrub.htm, downloaded Dec. 19, 2002.

Examiner's First Report on Australian Patent Application No. 2004203491, mailed Oct. 25, 2006.

Official Action for Canadian Patent Application No. 2476338, mailed Jun. 13, 2006.

* cited by examiner

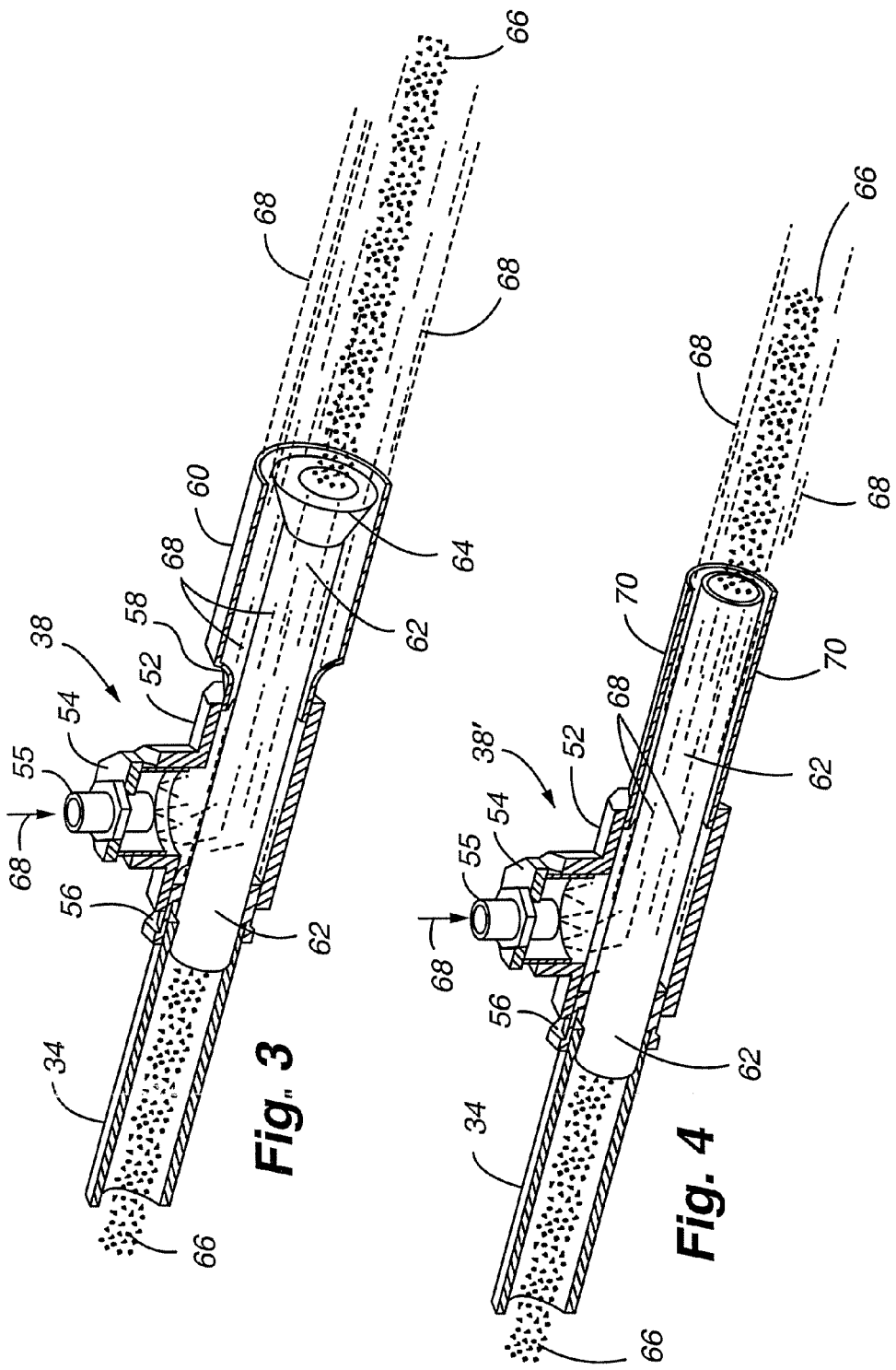

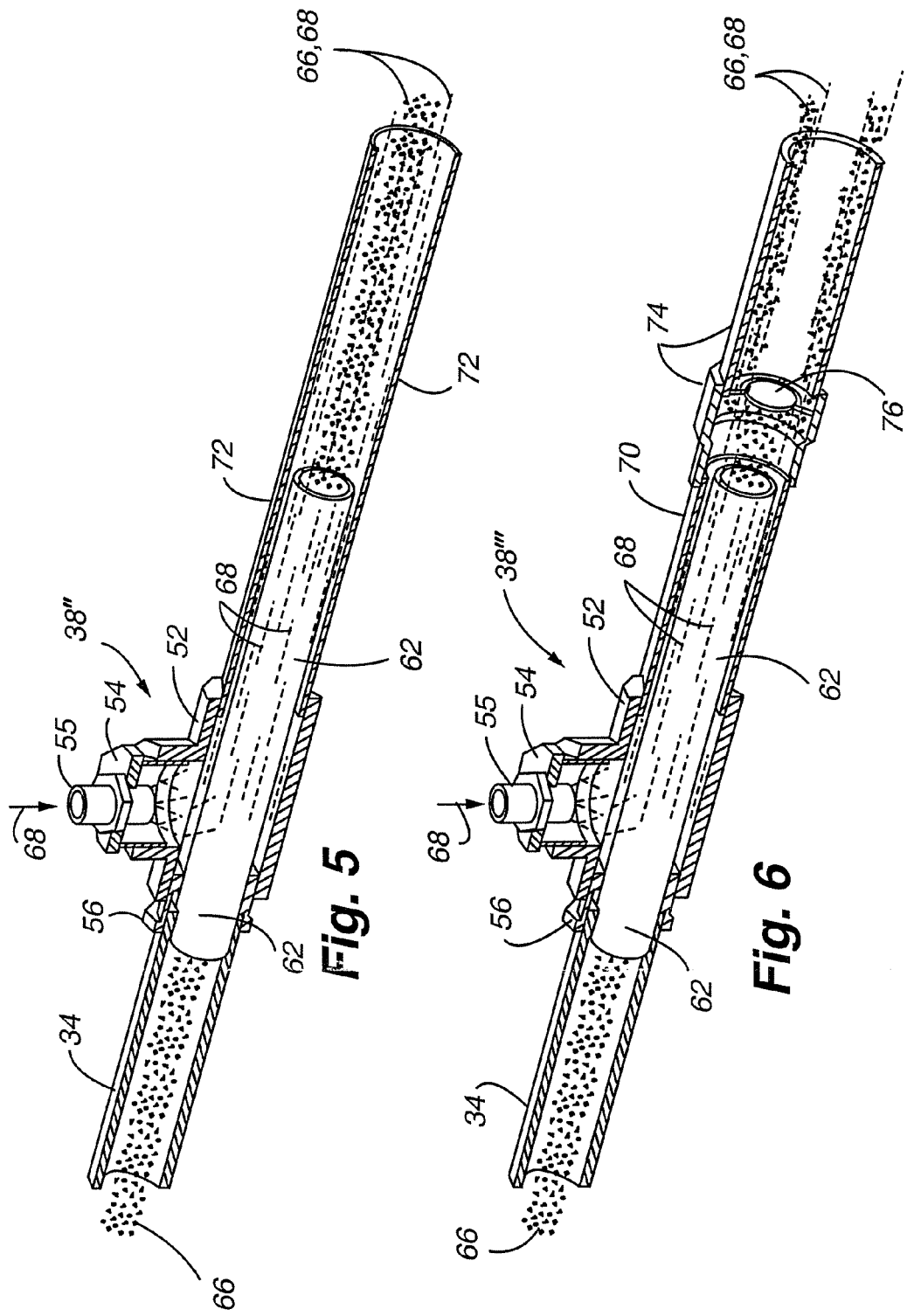

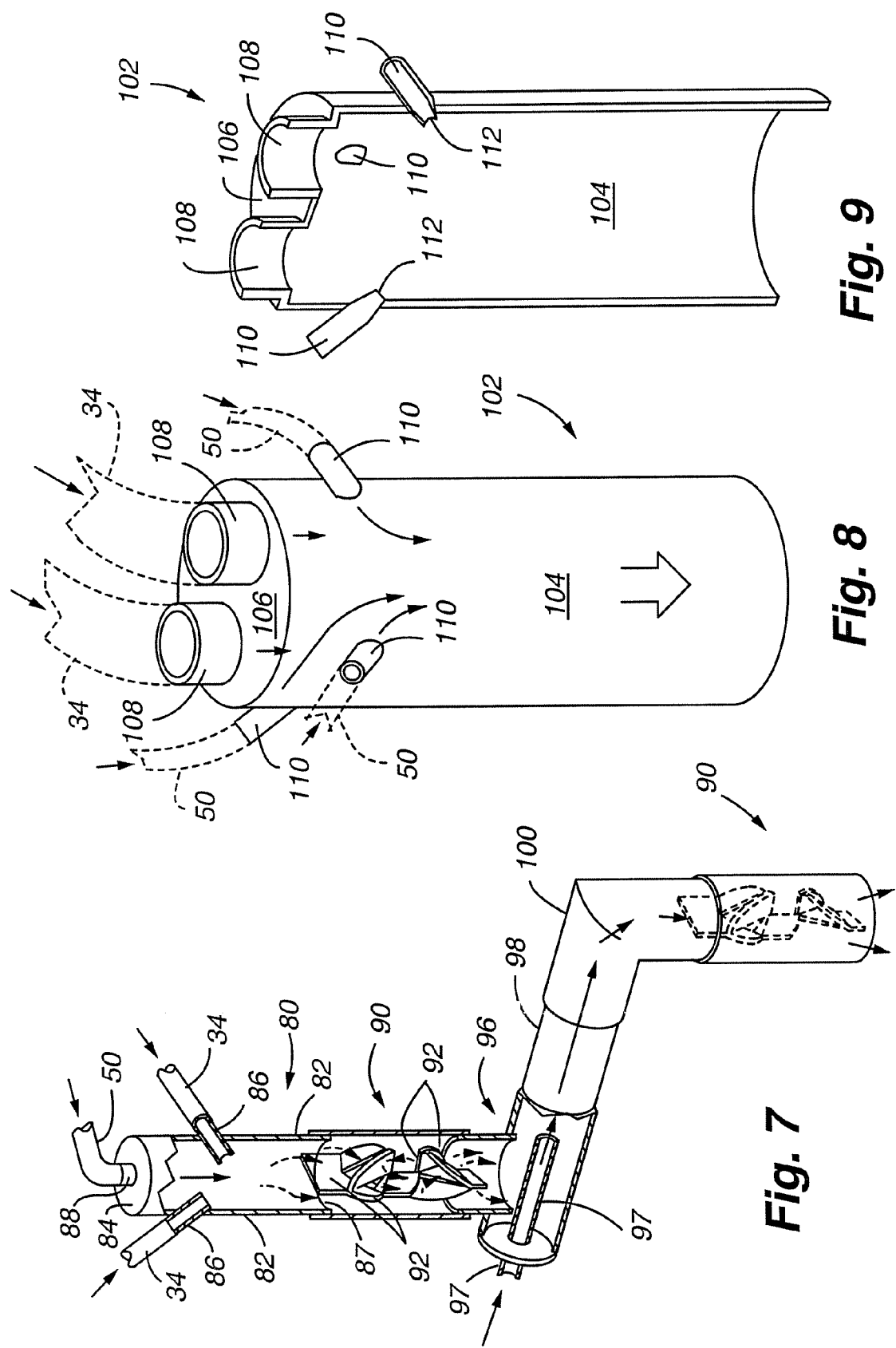

METHOD AND APPARATUS FOR ADMINISTERING MICRO-INGREDIENT FEED ADDITIVES TO ANIMAL FEED RATIONS

CROSS REFERENCE TO RELATED APPLICATION

The present application is a divisional of U.S. patent application Ser. No. 10/633,463, filed Jul. 31, 2003, now U.S. Pat. No. 7,325,967, entitled "METHOD AND APPARATUS FOR ADMINISTERING MICRO-INGREDIENT FEED ADDITIVES TO ANIMAL FEED RATIONS", which is incorporated herein by reference.

FIELD OF THE INVENTION

The present invention relates to micro-ingredients added to feed rations for animals such as livestock, and more particularly, to a method and apparatus for administering micro-ingredient feed additives to a feed ration.

BACKGROUND OF THE INVENTION

Providing animals with various dietary supplements and medications such as vitamins, minerals, enzymes, hormones, and antibiotics is a common and well known practice in the livestock and poultry industries. The manner in which these supplements are mixed together and added to a consumptive fluid carrier such as water is disclosed in a number of patents to Pratt including the U.S. Pat. Nos. 4,889,443; 4,815,042; 4,733,971; and 5,219,224.

In these references as well as many others, it is known to utilize automated systems which dispense discrete amounts of micro-ingredients, mix the micro-ingredients, and then deliver the micro-ingredients to a feed ration, typically in a slurry mixture form. The prepared slurry may be fed directly to the animals, or may be added to the animal feed rations using mixing or spraying methods.

Most animal feed supplements include pharmaceuticals, and mixing these pharmaceuticals with animal feed causes them to be subject to the regulations of the Food and Drug Administration (FDA). Accordingly, the locations which produce these medicated feeds must maintain compliance with FDA regulations, and such locations are routinely inspected by FDA personnel. Therefore, it is imperative that the equipment used in the processes be capable of accurately and precisely metering, dispensing and mixing quantities of the micro-ingredients.

One focus for many of the prior art references which disclose equipment used for dispensing and mixing micro-ingredients is to improve accuracy and precision in delivering the micro-ingredients. One particular disadvantage with many of the prior art systems is that although they may be able to accurately and precisely dispense and mix micro-ingredients, such systems are overly complex, and are difficult to clean and maintain.

One step in traditional approaches of manipulating micro-ingredients which can be eliminated or at least simplified is the mixing of the micro-ingredients prior to addition of the micro-ingredients to a feed ration. Feed rations are typically stored in large batch-feed mixers prior to delivery of the rations to a feed truck which then distributes the feed to bunk feeders for consumption by animals. It has been found through various trials that mixing of the feed ration which inherently takes place at the batch feed mixers is in most instances adequate for also mixing and dispersing micro-ingredients throughout the feed ration. By requiring use of a mixer within a micro-ingredient dispensing system, the mixer itself is an additional piece of equipment which must be maintained and cleaned, and adds to the overall cost and complexity of the system.

Accordingly, one important object of the present invention is to provide a micro-ingredient delivery system that is capable of accurately and precisely manipulating the micro-ingredients for delivery to a feed ration, but such a system is easier to clean, maintain, and is also made simpler either by elimination of one or more pieces of mixing equipment, or by simplifying mixing if required by utilizing static mixing techniques.

Another object of the present invention is to provide a micro-ingredient delivery system that pneumatically conveys the micro-ingredients thereby eliminating the need to create a slurry mixture for delivery of the micro-ingredients to a desired location such as a feed mixer.

Another object of the present invention is to provide a micro-ingredient delivery system that is conducive to automation through the use of a computer or industrial Programmable Logic Controller (PLC).

It is yet another object of the present invention to provide a micro-ingredient delivery system whereby accurate records may be kept to comply with FDA regulations.

SUMMARY OF THE INVENTION

In accordance with the present invention, a method and apparatus are provided for administering micro-ingredient feed additives or supplements to feed rations. The apparatus of the present invention may be referred to as a system that includes a number of discrete components which cooperate together to ultimately deliver the micro-ingredients to a desired location, such as a large batch of feed ration stored in a feed mixer.

The micro-ingredients are initially stored in one or more storage bins. The micro-ingredients are dispensed from the bins either by volumetric metering or by weight. Once the desired amounts of micro-ingredients have been dispensed, the micro-ingredients are then conveyed through a pneumatic transport means to a desired location such as a feed mixer. Transfer of the micro-ingredient to the feed ration is achieved without the addition of liquid in the transport line, bin, and hopper. In the preferred embodiments, the dispensed micro-ingredients communicate with one or more pneumatic eductors. The eductor(s) are placed in line with one or more transport lines or pipes. A pressurized source of air causes flow of air through the line(s), and draws the micro-ingredients through the eductor(s) into the transport line(s). The micro-ingredients are then pneumatically conveyed through the transport line(s) to the feed mixer.

In one embodiment, the dispensed micro-ingredients may be weighed in a weigh hopper. After weighing, the micro-ingredients are released into an intermediate collection tank.

In another embodiment, the micro-ingredients may be dispensed directly from the bin(s) into the intermediate collection tank because the delivered amounts of micro-ingredients are measured by the loss in weight of the bin(s) in which the particular micro-ingredients are stored. The loss in weight may be measured by load cells mounted under the bin(s).

In yet another embodiment, dispensed micro-ingredients are volumetrically metered by a feed screw in each bin. Each feed screw is calibrated for delivering precise amounts of particular types of micro-ingredients. Each feed screw is controlled by a computer or PLC which accurately controls and records the operation of each feed screw. Activation of a feed screw at a particular rotational speed over a set duration of time corresponds to a particular amount of a dispensed micro-ingredient. In all of the embodiments, when more than one micro-ingredient is dispensed, dispensing may be simultaneous, sequential, or a combination of both.

One or more blower units provide the motive force to pressurize the transport line(s) thereby propelling the micro-ingredients from the eductor(s) downstream to the feed mixer or other desired location.

The number of components used within the system of the present invention may be increased or decreased based upon the number and type of micro-ingredients which are to be delivered. In a basic embodiment, the apparatus of the present invention may include a single storage bin, a means for metering or weighing micro-ingredient(s) stored in the storage bin, an eductor which communicates with micro-ingredient(s) dispensed from the bin, and a single transport line which pneumatically conveys the micro-ingredient(s) to a desired location such as a feed mixer. In this basic embodiment, micro-ingredients would be stored, metered/weighed, and delivered sequentially. If it were desired to have the ability to simultaneously deliver multiple micro-ingredients, then duplication of various components of the system would be required. For example, two or more storage bins, two or more means for metering/weighing, two or more eductors, and two or more transport lines may be provided. Additionally, a single blower or multiple blowers may be used to provide the desired pressurization in the transport line(s) for delivery of the micro-ingredient(s). Thus, it can be seen that the apparatus of the present invention is easily adaptable to the number and type of micro-ingredients which must be routinely delivered. Also, it is contemplated that various combinations of the components can be provided. Accordingly, duplicate sets of each of the components may not be necessary. For example, two or more storage bins could communicate directly with a single eductor for simultaneous delivery of micro-ingredients through a single transport line. In this example, although there are two storage bins, there are not duplicate sets of the other components because a single eductor and a single transport line are used.

The degree to which various components must be duplicated within the system of the present invention in order to deliver the desired micro-ingredients also depends upon the type of micro-ingredients which are to be routinely delivered. For example, to prevent cross contamination, it may be particularly desirable to have separate components for delivering antibiotics or other FDA regulated pharmaceuticals. For other micro-ingredients such as vitamins, nutritional supplements, or other nonregulated substances, it may be possible to use a single storage bin, and then sequentially deliver those non-regulated ingredients. However, even with non-regulated ingredients, it may be advantageous to provide duplicate sets of components to allow simultaneous delivery of the micro-ingredients as opposed to sequential micro-ingredient delivery. There may be a standard set of micro-ingredients which are routinely delivered to a feed ration. In such case, the system of the present invention can be tailored to best effect economical yet efficient delivery of the micro-ingredients. For example, if there were routinely four types of micro-ingredients which were to be delivered to a feed ration, it may be desirable to provide four separate storage bins which individually meter/weigh the four separate micro-ingredients. If one of the micro-ingredients included a regulated pharmaceutical, then it would be preferable to also provide a separate conveying line for this particular micro-ingredient. However, for non-regulated micro-ingredients, it may be desirable to provide a single conveying line.

In order to alleviate problems associated with production of dust as the micro-ingredients are delivered to the feed mixer, a liquid interface may be provided at the discharge ends of the transport lines. Particularly in high wind conditions, creation of dust can be problematic. For pharmaceutical type micro-ingredients, it is also important to limit loss of these ingredients in delivery to the feed mixer. The liquid interface can be produced in the form of a water curtain which would effectively shield the dry micro-ingredients as they enter the feed mixer. A water curtain device can be incorporated at the discharge end of each transport line to create a continual stream of liquid to surround the micro-ingredients as they leave the discharge ends of the transport lines. The structure and function of the water curtain devices is not to mix the liquid with the micro-ingredients, but simply to shield the micro-ingredients from air flow which might create dust and loss of micro-ingredients. Additionally, if there is a requirement that the micro-ingredients be mixed with water prior to delivery of the micro-ingredients to the feed mixer, a number of simple yet effective mixing devices may be placed at the discharge ends of the transport lines to provide the required mixing. These mixing devices are not mechanically or electrically driven, and have no moving parts. Thus, they can be characterized as static mixers which take advantage of the flow of the micro-ingredients and flow of water (if water is required) to effect the desired mixing. As discussed below with respect to the preferred embodiments, various types of static mixing devices can be used either alone, or in series with one another.

Other features and advantages of the present invention will become apparent by a review of the accompanying drawings taken along with the detailed description.

BRIEF DESCRIPTION OF THE DRAWINGS

FIG. 3 is a fragmentary perspective view of a discharge device;

FIG. 4 is a fragmentary perspective view of another type of discharge device;

FIG. 5 is another fragmentary perspective view of a discharge device;

FIG. 6 is yet another fragmentary perspective view of a discharge device;

FIG. 7 is a fragmentary perspective view of a series of discharge devices specifically adapted for mixing dry micro-ingredients with liquid prior to delivery of the micro-ingredients to the feed mixer;

FIG. 8 is an enlarged perspective view of a mix manifold which may be used alone or in series with at least one of the devices shown in FIG. 7; and FIG. 9 is a fragmentary perspective view of the mix manifold of FIG. 8 illustrating the interior details thereof.

DETAILED DESCRIPTION

Figure 1:
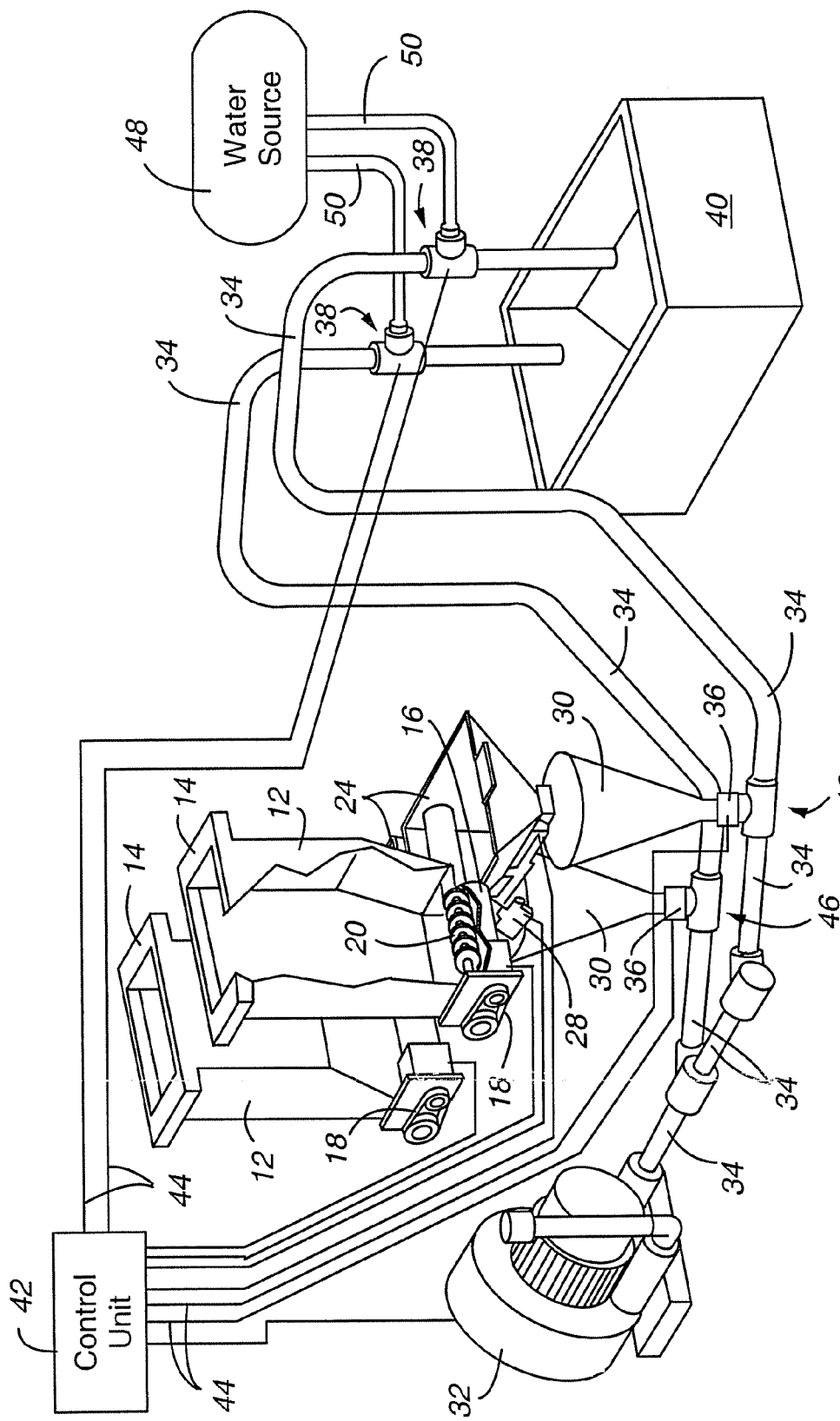
FIG. 1 is a schematic view of one preferred embodiment of the present invention.

FIG. 1 illustrates one preferred embodiment of the system of the present invention which is specifically designed for storing, dispensing, measuring, and delivering micro-ingredients from an initial location where each of the micro-ingredients are stored, to a desired location such as a feed mixer containing a feed ration. Initially, the micro-ingredients are stored in one or more storage bins 12. The bins may have an open upper end 14 or a closed upper end having a reclosable lid (not shown). The bins with lids may be sealed storage units, and the bins may be pressurized in order to assist in dispensing of the micro-ingredients. Means are provided for dispensing the micro-ingredients from the bins 12 to a weigh hopper 24 as shown in FIG. 1. One preferred manner in which the micro-ingredients may be dispensed from the bins is by use of an auger 20 which is powered by a motor 16. One of the motors 16 and a portion of the corresponding bin 12 is broken away in FIG. 1 to view the auger 20. A drive belt 18 would transfer rotation from the motor 16 to the auger 20 which would rotate to transfer a desired amount of micro-ingredient from the bin 12, through discharge tube 22, and into the weigh hopper 24. The speed and duration for operation of the auger 20 would be controlled as by a control unit 42 which would be programmed for operating the auger 20 as further discussed below. FIG. 1 illustrates a pair of storage bins 12 which dispense their micro-ingredients into a corresponding pair of weigh hoppers 24. It is also contemplated within this embodiment and the others discussed below to provide a single weigh hopper for a plurality of storage bins depending upon the types and quantities of micro-ingredients which are required to be routinely delivered to a feed ration. Micro-ingredients may be dispensed either simultaneously or sequentially into the weigh hoppers, again depending upon the micro-ingredients to be delivered. The weigh hoppers 24 provide an indication of the weight of the micro-ingredients which have been added thereto, and the weigh hoppers also electrically communicates with control unit 42. The control unit controls the operation of the augers 20 by comparing weighed amounts of the dispensed micro-ingredients to desired amounts, and then operating the augers with the correct speed and duration to satisfy a particular needed quantity of the micro-ingredients. Once the desired amount of one or more micro-ingredients are delivered to the weigh hoppers and the weights have been confirmed by the scales 26 of the weigh hoppers, the micro-ingredient(s) may be released from the weigh hoppers as by discharge valves 28 which allow the micro-ingredient(s) to fall directly into the corresponding pair of product collection tanks 30. The number of product collection tanks would correspond to the number of weigh hoppers which were used in the particular combination. The micro-ingredient(s) would then remain within the respective product collection tank(s) until such time the micro-ingredients were to be delivered to the feed ration.

One or more transfer or transport lines 34 are used to convey the micro-ingredients to the desired location, such as an animal feed mixer 40 which may contain a particular feed ration. The number of transfer/transport lines 34 which are used may be varied depending upon the desirability of segregating micro-ingredients to prevent cross-contamination, or other concerns. For example, if one particular storage bin, hopper, tank and transport line were dedicated for delivery of certain types of antibiotics, it would be preferable to maintain those dedicated components so that tedious and time consuming cleaning would not have to occur each time a different micro-ingredient was used. If other micro-ingredients pass through the same set of components, cross contamination may arise, of which would require a time consuming cleaning between delivery of differing micro-ingredients.

After the micro-ingredients have been collected within the respective collection tanks 30, the micro-ingredients are introduced into the transport lines 34 through eductors 46 which are placed in line with the transport lines, and connect to the respective collection tanks 30. Valves 36 located below the collection tanks 30 would be operated to allow the eductors to draw the micro-ingredients into the transport lines 34 for pneumatic conveying. The transport lines 34 are pressurized by a blower unit 32 which provides a source of air. The blower unit 32 would be sized to provide the necessary motive force to adequately propel the micro-ingredients through the transport lines to the desired location. The control unit 42 would also control the appropriate time at which the valves 36 would be operated to allow delivery of the micro-ingredients. Although simultaneous delivery of the micro-ingredients would be the most common situation, it is also possible to sequentially and separately convey the micro-ingredients as desired. Accordingly, valves 36 could be operated simultaneously or sequentially. The control unit would also control activation of the blower unit 32 at the appropriate time for pressurization of the lines 34.

The control unit 42 may be in the form of a programmable logic controller which essentially operates as a computer with software which can be programmed to control each of the components or elements in the system. As well understood by those skilled in the art, the PLC is capable of operating a wide array of output devices such as valves 36, blower unit(s) 32, motor(s) 16, and eductor(s) 46 while also capable of receiving numerous inputs which monitor the system, such as scale(s) 26 or the load cell(s). Various electrical or pneumatic control lines 44 illustrate that each of the components are either controlled by control unit 42 or provide input to the control unit 42.

Optionally, one or more discharge devices 38 may be used to shield or condition the micro-ingredients prior to delivery to the feed ration. To prevent loss of micro-ingredients as they enter the feed mixer, the discharge devices 38 may be in the form of a water curtain apparatuses which create a protective curtain of liquid surrounding the dry micro-ingredients as they enter and make contact with feed in the feed mixer. Accordingly, liquid source 48 is shown with one or more liquid lines 50 which connect to the corresponding discharge devices 38 thereby providing the desired flow of liquid. Alternatively or in combination with a water curtain device/apparatus, one or more deliberate mixing devices can be incorporated. These mixing devices may be used to create a slurry mixture of the micro-ingredients and liquid which then enter the feed mixer. If it was desired to deliberately mix the dry micro-ingredients with liquid to create the slurry, then such a slurry mixture would also inherently help to avoid loss of micro-ingredients due to adverse weather conditions such as high winds.

Figure 2:
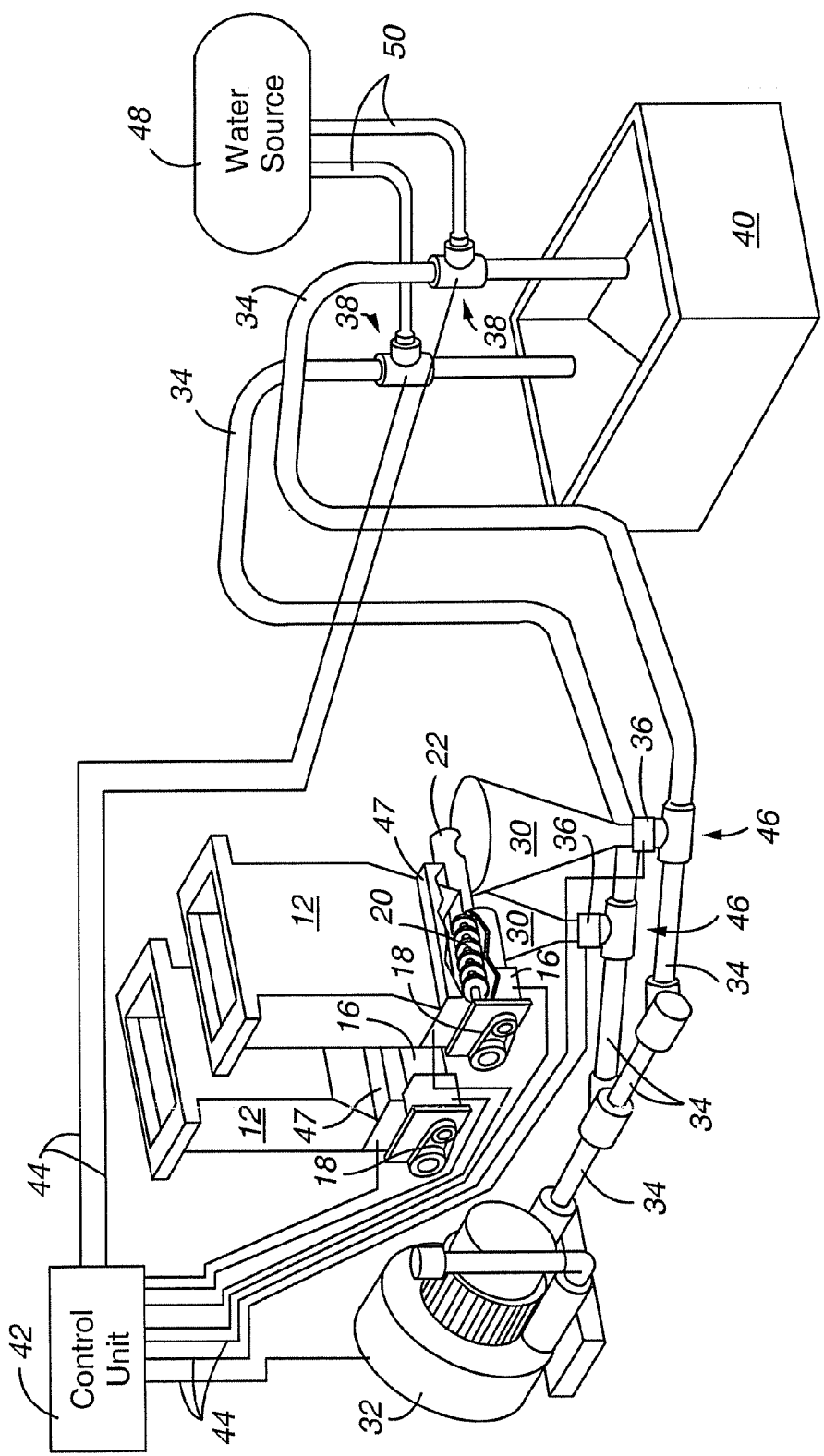
FIG. 2 is another schematic view of another preferred embodiment of the present invention.

FIG. 2 illustrates another preferred embodiment of the present invention wherein the weigh hoppers 24 and scales 26 are eliminated in favor of a different means by which to measure the dispensing of micro-ingredients. Like numbers in this embodiment correspond to the same elements discussed above with respect to the first embodiment of FIG. 1. FIG. 2 represents two alternate means by which the system may measure the dispensing of the micro-ingredients. One additional way in which the micro-ingredients may be weighed is by load cells which may be positioned under the storage bins 12 and mounted on platforms 47. The load cells provide weight measurement by a signal sent to the control unit 42. With the use of load cells, the measured amounts of micro-ingredients would be calculated by loss in weight of the storage bins as the micro-ingredients are dispensed. In lieu of measuring the dispensed amount of micro-ingredients as by load cells, each auger 20 could be precisely calibrated to dispense the desired quantity of micro-ingredients. According to this method, a calibration would take place for each of the augers 20 to ensure that operating the augers at a particular speed and duration corresponded to dispensing of a known amount of a micro-ingredient. Volumetric metering of micro-ingredients in this fashion is suitable for those micro-ingredients which are delivered in greater quantities, as it is much more difficult to accurately meter smaller quantities of micro-ingredients. For both the loss in weight and volumetric metering methods, the micro-ingredients are dispensed directly into the respective product collection tanks 30. Thus, there is no need for any type of hopper or other intermediate structure thereby further simplifying the system.

As with FIG. 1, FIG. 2 also illustrates that a discharge device 38 may be used to condition delivery of the micro-ingredients prior to entering the feed ration. In some circumstances, it may be desirable to actually add liquid to the micro-ingredients to create a slurry mix, or liquid could be used as a water curtain to provide dust control. Accordingly, FIG. 2 also illustrates a liquid source 48 having one or more liquid lines 50 which connect to the corresponding discharge devices 38.

FIG. 3 illustrates one particular example of a discharge device 38 in the form of a water curtain apparatus that provides a curtain of water surrounding the dry micro-ingredients thereby providing dust control. Particularly in windy conditions, it is important that the full dose of the micro-ingredients be delivered to the feed ration, and unacceptable losses may be present if the dry micro-ingredients are blown away from the feed ration. Structurally, the water curtain device is similar to an eductor. Dry micro-ingredients 66 enter the water curtain device through the transport line 34, and then pass through inner concentric tube 62. The body 52 of the water curtain device surrounds inner tube 62, and an interior gap exists between the inner surface of the body 52 and the exterior surface of the inner tube 62. A liquid 68, typically water, is introduced into the water curtain apparatus through fitting 54. Fitting 54 includes a tube 55 which communicates with the interior gap of the body 52. The upstream end 56 of the body 52 is sealed so that the liquid 68 may only flow towards the downstream end 58 of the body 52, thereby allowing the liquid to surround the inner concentric tube 62 in a concentric fashion. A flange 64 may attach to the downstream end of the inner concentric tube 62 as shown. This flange 64 would thereby act as a nozzle increasing the velocity of the liquid 68 which would then exit the discharge tube 60, and the liquid would form a cylindrical shaped curtain which surrounds the dry micro-ingredients 66 as they exit the device. As shown, there is no contact of the liquid 68 with the dry micro-ingredients 66 until the micro-ingredients have exited the water curtain device. As also shown, the downstream ends of the flang 64 and discharge tube 60 terminate substantially coterminous with one another.

Referring now to FIG. 4, an alternate configuration is provided for a water curtain device 38'. For this configuration, a smaller diameter discharge tube 70 is used so that a much smaller gap exists between inner concentric tube 62 and the discharge tube 70. Additionally, in FIG. 4, the water curtain device does not utilize a flange 64; therefore, there is less acceleration of the liquid as the liquid exits. FIG. 4 also illustrates that the downstream ends of the inner tube 62 and discharge tube 70 terminate substantially coterminous with one another.

FIG. 5 illustrates another example of a water curtain device 38'' which is the same as the device shown in FIG. 4, the only structural distinction being that the discharge tube extends downstream beyond the discharge end of the inner concentric tube 62. Therefore, there would be some mixing of the dry micro-ingredients and the liquid as the micro-ingredients and liquid travel through an extended discharge tube 72. Nonetheless, the discharge tube 72 would still provide some water curtain effect to prevent dust.

FIG. 6 illustrates yet another example of a water curtain device 38''' which may be used. In this particular device, it provides a water curtain, and deliberate mixing of the micro-ingredients with the liquid stream. As shown, a mixing tube extension 74 connects to the discharge end of the discharge tube 70, and a mixing plate 76 would be suspended transversely within the mixing tube extension 74 so that the micro-ingredients exiting inner concentric tube 62 and liquid exiting the discharge tube 70 would strike the mixing plate 76 causing some turbulent flow, and thereby increasing the degree to which the micro-ingredients are mixed with the liquid. The micro-ingredients and liquid which would then exit the mixing tube extension 74 might then be characterized as a wet feed mixture but not a well mixed slurry. Since the micro-ingredients would at least be wetted, dust would also be controlled.

Referring to FIG. 7, in lieu of providing a single discharge device 38, it may be desirable to provide a series of mixing devices at the discharge ends of the transport lines 34 in order to mix dry ingredients and maintain a dry mixture upon delivery to the feed ration, or to deliberately add liquid to form a slurry prior to delivery. With the in-line mixing devices described in this Figure, adequate mixing of the micro-ingredients can be achieved without having to use the more complex and costly mechanical mixers which typically mix the micro-ingredients with water prior to transport in transport lines.

The first component which is shown in FIG. 7 for receiving a flow of micro-ingredients is a mix manifold 80 which may include a housing 82, a sealing plate 84, and a plurality of inlet ports 86. Inlet ports 86 connect to the respective transport lines 34 delivering micro-ingredients. The inlet ports 86 allow the micro-ingredients carried within the transport lines 34 to enter the housing 82 at an angle, and mixing would then take place as the micro-ingredients intermingle within the housing 82. The discharge end 87 of the mix manifold could then directly deliver the micro-ingredients to the feed ration, or yet another mixing device can be used, such as a static mixer 90 as shown. One example of a commercially available static mixer is a Komax Static Mixer. This type of static mixer includes a pattern of internal baffles 92 which provide excellent mixing of streams of products as they pass through the mixer. The discharge end of this static mixer 90 may then directly deliver the micro-ingredients to the feed ration, or yet additional mixing devices could be used. In FIG. 7, the particular combination there illustrates the dry micro-ingredients then entering an eductor 96. This particular eductor 96 would be characterized as a liquid eductor in that a stream of liquid would enter the eductor through interior tube 97, and the dry micro-ingredients would move downstream in a concentric fashion around the inner concentric liquid stream carried by tube 97. The interior tube 97 terminates at or near the junction between extension tube 98, and some initial mixing of the liquid and dry micro-ingredients would take place there. Finally, the micro-ingredients and the liquid could be finally mixed at another downstream static mixer 90. An intermediate elbow 100 is shown as the connection between extension tube 98 and the downstream mixer 90. The liquid and dry micro-ingredients would exit the final static mixer 90 in a slurry mixture. If it were necessary to clean the series of mixing devices shown in FIG. 7, mix manifold 80 can be provided with a flush water inlet 88 which would allow a liquid stream to completely flush and clean each of the components.

One additional example of a device which may be used to deliberately mix a plurality of dry micro-ingredients, or a plurality of micro-ingredients with a liquid stream is illustrated by the multi-mix manifold 102 shown in FIGS. 8 and 9. The structure of the multi-mix manifold 102 is characterized by housing 104, a sealing plate 106, a plurality of spaced inlet ports 108 which extend substantially parallel to the longitudinal axis of the housing 104, and a plurality of angled inlet ports 110. Dry micro-ingredients would typically flow through inlet ports 108. Liquid would flow through the angled inlet ports 110 if it were desired to mix the micro-ingredients with a liquid. The inlet ports 110 may be further described as nozzles because their downstream ends 112 may be tapered to increase the velocity of the liquid flowing therethrough. The spaced arrangement of the angled inlet ports 110 would facilitate increased contact between the dry micro-ingredients and the liquid as the streams enter the housing 104. The quantity and speed at which the micro-ingredients and liquid enter the housing 104 would determine the degree to which the two elements would be mixed, and the speed and quantities could be controlled to achieve the desired level of mixing. The multi-mix manifold 102 could be used alone as the sole mixing device, or it could be used in combination with one or more of the components illustrated in FIG. 7. For example, the multi-mix manifold 102 could be incorporated with a downstream eductor 96 wherein the multi-mix manifold would only mix dry ingredients, and then water would be added to the dry ingredients through the eductor 96. Additionally, a static mixture 90 could be incorporated downstream of the eductor 96 in order to achieve final liquid and dry mixing to create a slurry mixture.

Although the invention has been described with respect to preferred embodiments, it shall be understood that various other modifications to the embodiments are deemed to fall within the spirit and scope of the present invention as defined by the accompanying claims.

What is claimed is:

1. A method of measuring, dispensing, and pneumatically delivering micro-ingredients to a feed ration, said method comprising the steps of:
   providing a bin for storing a quantity of a micro-ingredient;
   metering the micro-ingredient from the bin to a weigh hopper;
   weighing the micro-ingredient in the weight hopper;
   providing a transport line and an eductor placed in line with transport line;
   pressurizing the transport line and eductor by a source of pressurized air;
   operating the eductor to draw the micro-ingredient from the weigh hopper and into the transport line; and
   pneumatically transferring the micro-ingredient to the feed ration without the addition of liquid to the micro-ingredient while the micro-ingredient is in the transport line, bin and hopper.

2. A method, as claimed in claim 1 further comprising the steps of:
   providing a discharge device at a discharge end of the transport line; and
   providing a flow of liquid through the device creating a curtain of liquid surrounding the micro-ingredient as the micro-ingredient exits a discharge end of the discharge device.

3. A method, as claimed in claim 1, further comprising the steps of:
   providing a mixing device at a discharge end of the transport line; and
   introducing a flow of liquid through the mixing device simultaneous with flow of the micro-ingredient thereby resulting in a slurry mixture of the micro-ingredient and liquid.

4. A method, as claimed in claim 1 wherein:
   said storage bin includes a plurality of bins and said weigh hopper includes a plurality of weigh hoppers wherein separate micro-ingredients are stored in each bin, and each micro-ingredient is metered to a corresponding weigh hopper, each weigh hopper weighing the micro-ingredient therein prior to transfer of the micro-ingredient to the transport line.

5. A method, as claimed in claim 1, wherein:
   said weighing step is achieved by measuring the gain of weight by addition of the micro-ingredient to the weigh hopper.

6. A method, as claimed in claim 1, wherein:
   said transferring step is achieved without re-circulation of the micro-ingredient through said transport line.

7. A method of measuring, dispensing, and pneumatically delivering micro-ingredients to a feed ration, said method comprising the steps of:
   providing a storage bin for storing a quantity of a micro-ingredient;
   metering the micro-ingredient from the bin to a means for storing temporarily the metered micro-ingredient;
   recording the loss of weight in the bin after the micro-ingredient has been metered to the means for storing, the recorded loss of weight corresponding to the amount of the micro-ingredient metered to the means for storing;
   providing a transport line and an eductor mounted in line with the transport line;
   pressurizing the transport line and eductor by a source of pressurized air;
   operating the eductor to draw the micro-ingredient from the means for storing into the transport line; and
   pneumatically transferring the micro-ingredient to the feed ration, said transferring step being achieved without the addition of liquid in the transport line, bin, and means for storing.

8. A method, as claimed in claim 7, further comprising the steps of:
   providing a discharge device at a discharge end of the transport line; and
   providing a flow of liquid through the device creating a curtain of liquid surrounding the micro-ingredient as the micro-ingredient exits a discharge end of the discharge device.

9. A method, as claimed in claim 7, further comprising the steps of:
   providing a mixing device at a discharge end of the transport line; and
   introducing a flow of liquid through the mixing device simultaneous with the flow of the micro-ingredient thereby resulting in a slurry mixture of the micro-ingredient and liquid.

10. A method, as claimed in claim 7, wherein:
    said storage bin includes a plurality of bins and said means for temporarily storing includes a plurality of means for temporarily storing wherein separate micro-ingredients are stored in each storage bin, and each micro-ingredient is metered into a corresponding means for temporarily storing.

11. A method, as claimed in claim 7, wherein:
    said transferring step is achieved without re-circulation of the micro-ingredient through said transport line.

12. A method of measuring, dispensing, and pneumatically delivering micro-ingredients to a feed ration, said method comprising the steps of:
    providing a storage bin for storing a quantity of a micro-ingredient;

metering the micro-ingredient from the bin to a means for storing temporarily the metered micro-ingredient, said metering step resulting in delivery of a predetermined and desired quantity of the micro-ingredient to the means for storing;

providing a transport line and an eductor mounted in line with the transport line;

pressurizing the transport line and eductor by a source of pressurized air;

operating the eductor to draw the micro-ingredient from the means for storing into the transport line; and pneumatically transferring the micro-ingredient to the feed ration, without addition of liquid to the micro-ingredient while the micro-ingredient is in the bin, means for storing, and transport line.

13. A method, as claimed in claim 12, further comprising the steps of:

providing a discharge device at a discharge end of the transport line; and providing a flow of liquid through the device creating a curtain of liquid surrounding the micro-ingredient as the micro-ingredient exits a discharge end of the discharge device.

14. A method, as claimed in claim 12, further comprising the steps of:

providing a mixing device at a discharge end of the transport line; and introducing a flow of liquid through the mixing device simultaneous with the flow of the micro-ingredient thereby resulting in a slurry mixture of the micro-ingredient and liquid.

15. A method, as claimed in claim 12, wherein:

said storage bin includes a plurality of bins and said means for temporarily storing includes a plurality of means for temporarily storing wherein separate micro-ingredients are stored in each storage bin, and each micro-ingredient is metered into a corresponding means for temporarily storing.

16. A method, as claimed in claim 12, wherein:

said transferring step is achieved without re-circulation of the micro-ingredient through said transport line.

17. A method of measuring, dispensing, and pneumatically delivering micro-ingredients to a feed ration, said method comprising the steps of:

providing a bin for storing a quantity of a micro-ingredient;

metering the micro-ingredient from the bin to a weigh hopper;

weighing the micro-ingredient in the weight hopper;

providing a transport line and an eductor placed in line with transport line;

pressurizing the transport line and eductor by a source of pressurized air;

operating the eductor to draw the micro-ingredient from the weigh hopper and into the transport line;

pneumatically transferring the micro-ingredient to the feed ration without the addittion of liquid to the micro-ingredient while the micro-ingredient is in the transport line, bin and hopper;

providing a discharge device at a discharge end of the transport line;

providing a flow of liquid through the device creating a curtain of liquid surrounding the micro-ingredient as the micro-ingredient exits a discharge end of the discharge device conveying the micro-ingredient to a feed mixer containing an animal feed ration, wherein the micro-ingredient is delivered to the feed ration without recirculating the micro-ingredient through the transport line and wherein the flow of the liquid prevents loss of micro-ingredients as they enter feed mixer.

* * * * *